(12) United States Patent
Nitto

(10) Patent No.: US 7,015,623 B2
(45) Date of Patent: Mar. 21, 2006

(54) VIBRATION TYPE DRIVE UNIT

(75) Inventor: Kiyoshi Nitto, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/612,152

(22) Filed: Jul. 3, 2003

(65) Prior Publication Data

US 2004/0007946 A1    Jan. 15, 2004

(30) Foreign Application Priority Data

Jul. 12, 2002    (JP) ............................... 2002-204343

(51) Int. Cl.
*H02N 2/00*    (2006.01)

(52) U.S. Cl. ..................... 310/323.01; 310/323.02; 310/323.08; 310/323.17

(58) Field of Classification Search ................ 310/316, 310/317, 323.02–0, 323.16–17, 323.01, 323.08, 310/323.17, 323.18
See application file for complete search history.

(56) References Cited

U.S. PATENT DOCUMENTS

| | | | |
|---|---|---|---|
| 4,453,103 A | * | 6/1984 | Vishnevsky et al. ... 310/323.02 |
| 4,959,580 A | * | 9/1990 | Vishnevsky et al. ... 310/323.02 |
| 5,508,580 A | * | 4/1996 | Maeno et al. .......... 310/323.13 |
| 5,886,455 A | * | 3/1999 | Tsukimoto ............. 310/323.01 |
| 6,781,283 B1 | * | 8/2004 | Tsukimoto ............. 310/323.16 |
| 6,867,532 B1 | * | 3/2005 | Brady et al. ........... 310/323.02 |

FOREIGN PATENT DOCUMENTS

EP    0473423 A2  *  3/1992

* cited by examiner

*Primary Examiner*—Thomas M. Dougherty
(74) *Attorney, Agent, or Firm*—Fitzpatrick, Cella, Harper & Scinto

(57) ABSTRACT

A vibration type drive unit comprises a vibrator made of an elastic body to which an electromechanical energy conversion element is fixed and a moving element which is in contact with a surface of the vibrator so that by applying an alternating signal to the electromechanical energy conversion element. A progressive wave is generated on a surface of the vibrator to move the moving element, wherein the vibrator has a plate-like elastic body and a column-like elastic body, the electromechanical energy conversion element is fixed to a side surface of the plate-like elastic body. The column-like elastic body is formed on a central portion of a surface of the plate-like elastic body which is different from the surface to which the electromechanical energy conversion element is fixed.

7 Claims, 9 Drawing Sheets

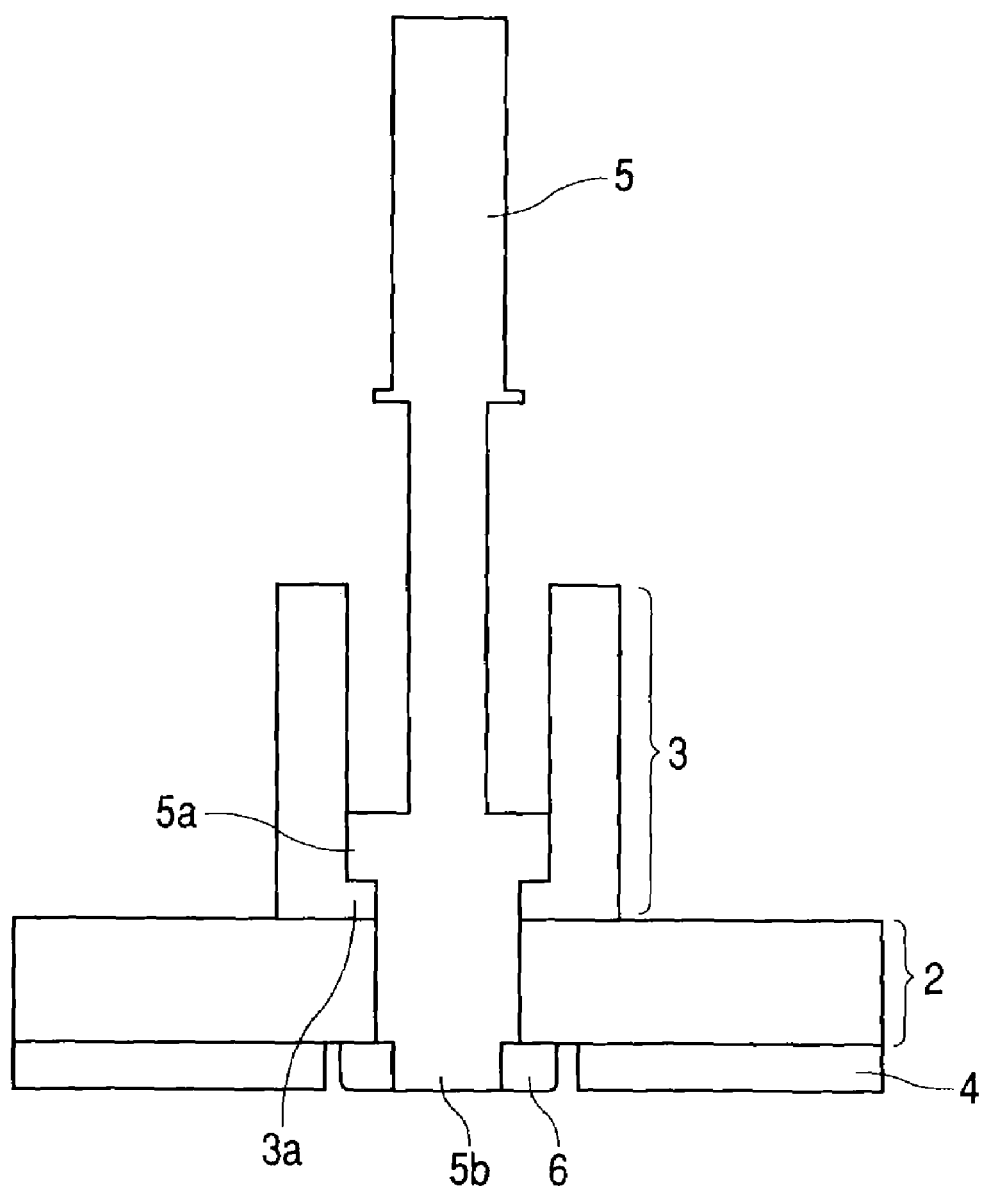

SURFACE   REAR

VIBRATION TYPE DRIVE UNIT

BACKGROUND OF THE INVENTION

1. Field of the Invention

The present invention relates to a structure of a vibration type drive unit such as an ultrasonic motor and the like and, in particular, to an improvement of the structure of a vibrator whose vibration is excited by applying a signal to a piezoelectric element.

2. Related Background Art

There is a vibration type drive unit, such as an ultrasonic motor and the like, in which a piezoelectric element that is an electromechanical energy conversion element is fixed on an elastic body, for example, made of a metal and an alternating signal is applied to this piezoelectric element to generate a progressive wave on the surface of the elastic body so as to move a moving element (rotor) which is at a pressure contact with the surface of elastic body by the progressive wave.

FIGS. 12A, 12B, 13A and 13B illustrate examples of the formations of conventional vibration type drive units.

FIG. 12A is a perspective view of a vibrator and a moving element (rotor) which is partly broken away, and FIG. 12B is a cross-sectional view in the rotation axis direction of the vibration type drive unit.

The reference numeral 101 denotes an annular elastic body made of a metal, and a piezoelectric element 102 is fixed on the bottom surface thereof. Grooves for enlarging vibration displacements are formed on the opposite surface of the piezoelectric element to the elastic body 101. Friction members 103 are arranged on the heads of protrusions formed by the grooves, and a rotor 104 is at a pressure contact with the friction members 103. The vibrator is composed of the elastic body 101, the piezoelectric element 102, and the friction members 103.

A flange portion whose thickness is thinner than the other parts is formed in the inner diameter portion of the elastic body 101 to extend toward the center of the circle, and this flange portion is fixed on a base member 108 of the vibration type drive unit. By disposing the flange portion having a spring characteristic on the fixing portion of the elastic body 101 and the base member 108, the vibrator can be supported without preventing the progressive wave from being generated. A disc spring 106 for pushing the rotor 104 in a direction toward the vibrator is fixed on the rotor 104, and since this disc spring 106 is fixed to a rotary shaft 105, the rotor 104 and the rotary shaft 105 rotate as a unit. Bearings 107 for rotatably supporting the rotary shaft 105 are provided on the base member 108. By disposing the plurality of bearings 107 in the axial direction, sway of the rotary shaft 105 is prevented.

An electrode pattern capable of generating two standing waves which are shifted ¼ wavelengths mutually is formed on the piezoelectric element 102, and when these two standing waves are excited while the phases thereof are shifted 90 degrees on a time scale, a progressive wave occurs on the surface of the elastic body 102. The rotor 104 is rotated and moved as if it were pushed out by the progressive wave.

This vibration type drive unit has a strong static torque at the time electricity is not turned on and has a strong rotational torque at the time the unit is driven so that it is possible to rotate and move the rotor to a desired position with high accuracy.

However, the vibration type drive unit shown in FIGS. 12A and 12B is not suitable for being miniaturized so much due to its shape.

Thus, there is a rod type vibration type drive unit shown in FIGS. 13A and 13B in order to obtain a more miniaturized one than the annular type vibration type drive unit shown in FIGS. 12A and 12B. FIG. 13A is a perspective view of a vibrator, and FIG. 13B is a cross-sectional view in the rotation axis direction of the vibration type drive unit.

The reference numerals 201, 202 indicate metal blocks, and a piezoelectric element 203 is disposed therebetween. The metal blocks 201, 202 and the piezoelectric element 203 have through holes, and a thread portion is formed on the inner diameter portion of the metal block 201. A supporting member 204 of the vibrator is inserted from the metal block 202 side so that the screw threads formed on the supporting member 204 are engaged with the screw threads of the inner diameter portion of the metal block 201. By tightening the supporting member 204, the piezoelectric element 203 and the metal block 202 are pressed to be fixed between the metal block 201 and a flange of an end portion of the supporting member 204. A narrow portion whose diameter is narrow for increasing vibration displacements is formed on the elastic body 201. Screw threads are formed on the distal end portion of the supporting member 204, a fixing member 208 is engaged with this distal end portion to be fixed by a nut 209, and an output gear 206 is rotatably supported about this fixing member 208. A rotor 205 is engaged with the output gear 206 so that when the rotor 205 rotates, the output gear 206 rotates and moves as a unit. A pressure spring 207 is disposed between the rotor 205 and the output gear 206 to impart a pressing force toward the elastic body 201 to the rotor 206.

When an alternating signal is applied to the piezoelectric element 203, two bending vibrations whose amplitude directions are orthogonal or approximately orthogonal to the axial direction and whose amplitude directions are mutually orthogonal or approximately orthogonal are excited, and these two bending vibrations are synthesized so that such a rotational movement as the elastic body 201 draws a circle approximately about the supporting member 204 occurs. Due to this rotational movement the rotor 205 which is at the pressure contact with the surface of the vibrator (that is, the surface of the elastic body 201) rotationally moves as if it were pushed out.

The vibration type drive unit shown in FIGS. 13A and 13B has a shape simpler than that of the vibration type drive unit shown in FIGS. 12A and 12B, and it can realize miniaturization particularly in the radial direction of the rotor.

However, as seen in FIGS. 13A and 13B, since the vibrator is constructed in such a way that the piezoelectric element is sandwiched between two elastic bodies, miniaturization for the size in the longitudinal direction of the supporting member of the vibration type drive unit has not been achieved so much compared with the size in the radial direction of the rotor. In order to miniaturize the size in the longitudinal direction of the supporting member, when the vibrator is simply miniaturized, the natural frequency of the vibrator increases and the vibration displacements decrease. Due to the increase of the natural frequency, an element in a drive circuit becomes expensive. Accordingly, it is deemed that there is still room for improvement in miniaturization of the size in the longitudinal direction of the supporting member of the vibration type drive unit without increasing the natural frequency of the vibrator.

SUMMARY OF THE INVENTION

One of characteristics of the present invention is a vibration type drive unit comprising a vibrator made of an elastic body to which an electromechanical energy conversion element is fixed and a moving element which is in contact with a surface of the vibrator so that by applying an alternating signal to the electromechanical energy conversion element, a progressive wave is generated on a surface of the vibrator to move the moving element, wherein the vibrator has a plate-like elastic body and a column-like elastic body, the electromechanical energy conversion element is fixed to a side surface of the plate-like elastic body, and the column-like elastic body is formed on a central portion of a surface of the plate-like elastic body which is different from the surface to which the electromechanical energy conversion element is fixed.

Another of characteristics of the present invention is a vibration type drive unit comprising a vibrator made of an elastic body to which an electromechanical energy conversion element is fixed and a moving element which is in contact with a surface of the vibrator so that by applying an alternating signal to the electromechanical energy conversion element, a progressive wave is generated on a surface of the vibrator to move the moving element, wherein the vibrator is in contact with the moving element by a surface of the vibrator which is positioned in the side opposite to the surface to which the electromechanical energy conversion element is fixed, and a part of the vibrator opposes an inner diameter portion of the moving element.

Further, another of characteristics of the present invention is an vibration type drive unit comprising a vibrator made of an elastic body to which an electromechanical energy conversion element is fixed and a moving element which is in contact with a surface of the vibrator so that by applying an alternating signal to the electromechanical energy conversion element, a progressive wave is generated on a surface of the vibrator to move the moving element, wherein by applying an alternating signal to the electromechanical energy conversion element, the vibrator generates a plurality of bending vibrations which are displaced in a direction approximately perpendicular to a predetermined surface of the electromechanical energy conversion element and a plurality of bending vibrations which are displaced in a direction approximately parallel to the predetermined surface.

With these structures, without increasing the natural frequency of the vibrator, a further compact vibration type drive unit can be provided.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a cross-sectional view of the vibrator constructing the vibration type drive unit according to the present invention.

DETAILED DESCRIPTION OF THE PREFERRED EMBODIMENT

Figure 1A:
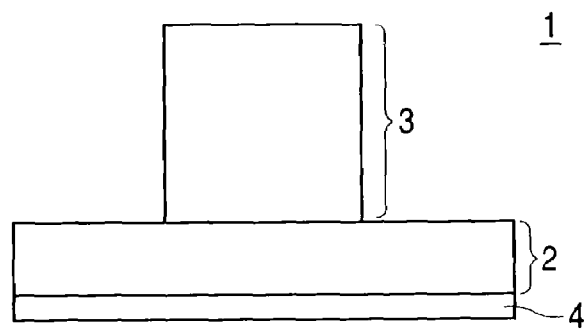
FIGS. 1A, 1B and 1C are schematic views of a vibrator constructing a vibration type drive unit according to the present invention.
Figure 1B:
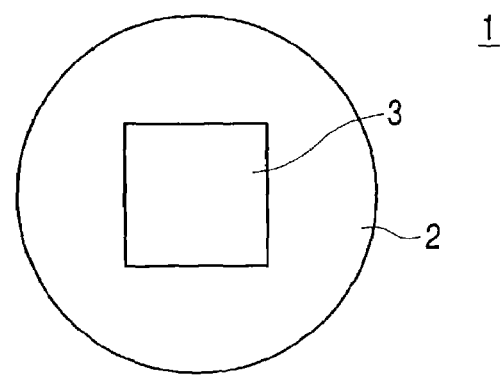
Figure 1C:
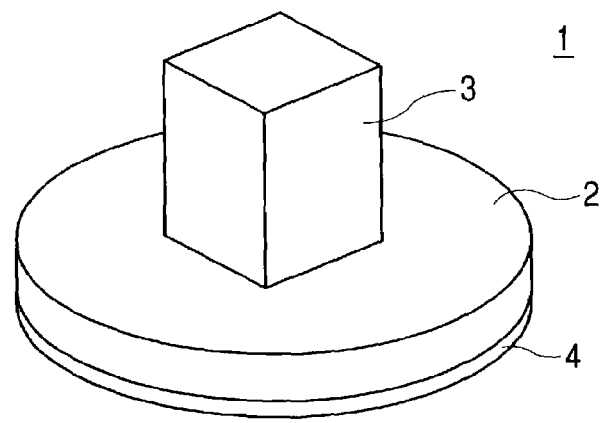

FIGS. 1A, 1B and 1C show a schematic view of a vibrator constructing a vibration type drive unit according to the present invention.

In the same drawing, FIG. 1A is a side view of the vibrator, FIG. 1B is a top view in which the vibrator is seen from a direction orthogonal to FIG. 1A, and FIG. 1C is a perspective view of the vibrator.

The vibrator 1 in FIGS. 1A, 1B and 1C has a structure that a piezoelectric element 4 that is an electromechanical energy conversion element is fixed by gluing or the like to a side surface of a plate-like (disc-like) elastic body 2 made of a material, such as a metal, whose periodic damping loss is small. Other than fixing by gluing, it is possible that through holes are formed in the central portions of the elastic body and piezoelectric element so that a screw inserted into the inner portion of the through hole is engaged with a nut as described later. A column-like elastic body 3 protruding in a direction perpendicular to a fixing surface of the piezoelectric element 4 is formed on the central portion of a surface of the plate-like elastic body 2 in the side opposite to the surface engaged with the piezoelectric element 4. The plate-like elastic body 2 and the column-like elastic body 3 may be integrally formed from the beginning, or they may be formed separately and engaged. As a method of engagement, a method that fixing to a supporting member provided with a thread is executed employing a nut can be thought.

Figure 13A:
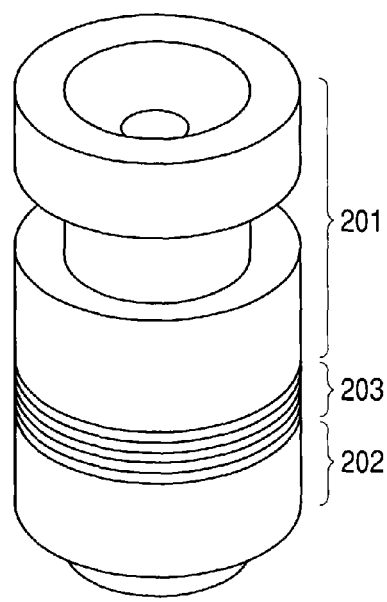
FIGS. 13A and 13B are cross-sectional views of a conventional rod type vibration type drive unit and a view showing its vibrator.
Figure 13B:
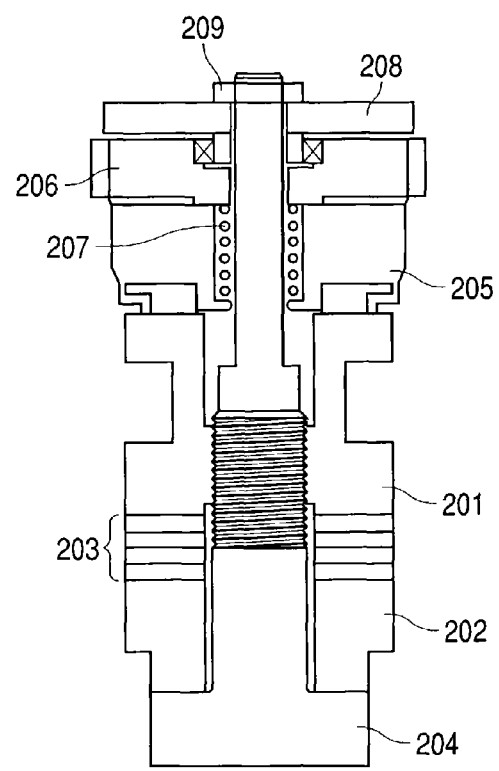

As shown in FIG. 2, a step 3*a* is provided on the inner wall of a through hole arranged in a center portion of the column-like elastic body 3, and a supporting member 5 is inserted into the through hole of the column-like elastic body 3 from the side opposite to the piezoelectric element 4. A step 5a is arranged on the middle of the supporting member 5, and this step 5a of the supporting member 5 abuts the step 3a provided on the inner wall of the through hole. At this time an end portion 5a of the supporting member 5 is formed to have a length so as to pass through the column-like elastic body 3 and the plate-like elastic body 2 and project from the plate-like elastic body 2 to the outside. Screw threads are formed on a distal end portion 5b of the supporting member 5, and by engaging these screw threads with a nut 6 to tighten it, the column-like elastic body 3 and the plate-like elastic body 2 can be fixed. A through hole which is a bit larger than the outer diameter of the nut 6 is provided in the central portion of the piezoelectric element 4 so that the nut 6 is arranged in the inner portion of the through hole. It is also possible to have a structure that fixing is performed by screw threads formed on the inner diameter portions of the elastic bodies without providing the step 3a, similarly to the vibrator shown in FIGS. 13A and 13B. As a method of fixing the column-like elastic body 3 and the plate-like elastic body 2, fixing by welding, gluing, forcible insertion, soldering, or the like may be thought other than the method described above.

Figure 3:
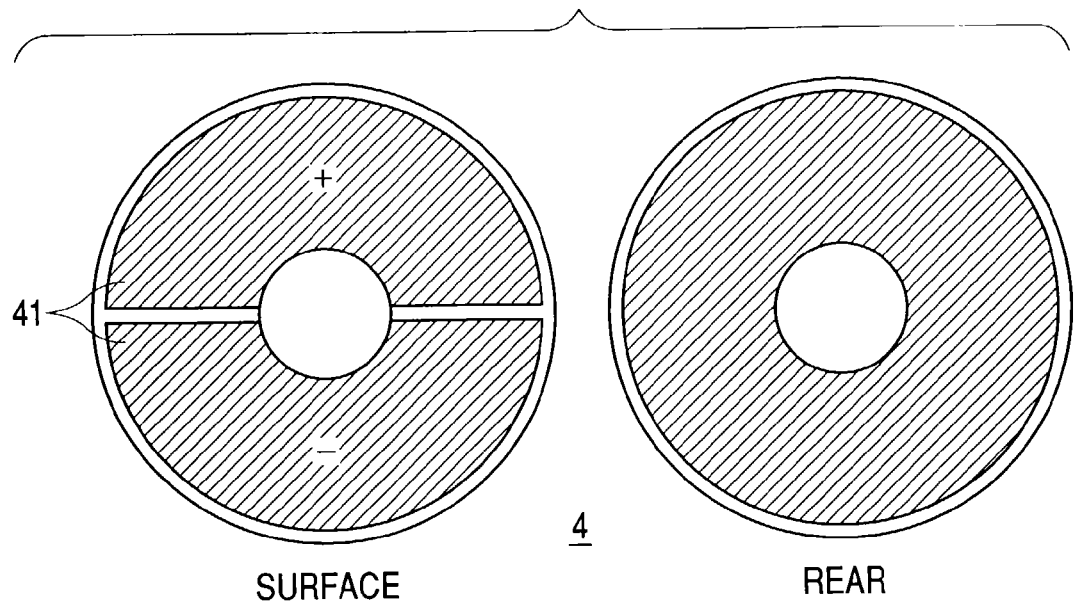
FIG. 3 is a plan view of one piezoelectric element employed for the vibrator constructing the vibration type drive unit according to the present invention.

As shown in FIG. 3, electrode films (shaded portions) are formed, for example, on both surfaces of the piezoelectric element 4, the electrode film of a side surface is divided into two electrode films 41, and polarization that is mutually directed oppositely in the thickness direction of the piezoelectric element 4 is imparted to two regions in which the electrode films 41 are formed. When the same alternating signals are applied to the two electrode films 41, one region of the piezoelectric element 4 expands in the thickness direction, and the other region shrinks in the thickness direction.

Figure 4:
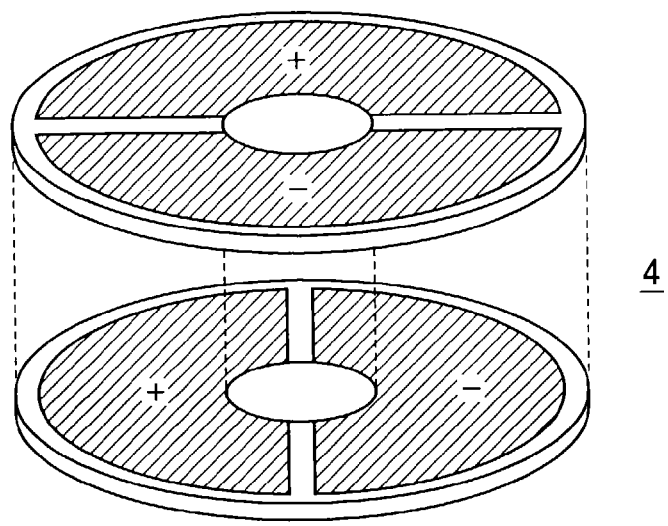
FIG. 4 is a perspective view of a plurality of piezoelectric elements employed for the vibrator constructing the vibration type drive unit according to the present invention.
Figure 5:
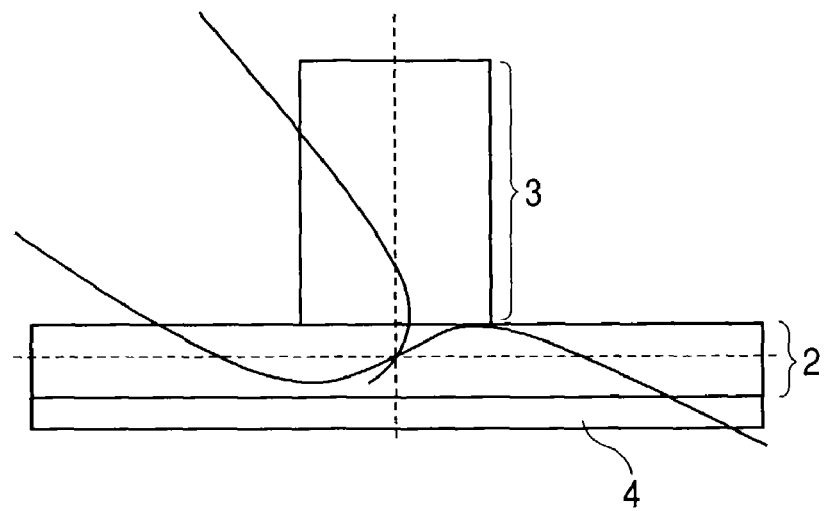
FIG. 5 is a view showing displacements of vibrations generated in the vibrator constructing the vibration type drive unit according to the present invention.

As shown in FIG. 4, the piezoelectric elements 4 are superimposed so that phases of the electrode films are displaced 90 degrees, and alternating signals whose phases are displaced 90 degrees on a time scale are applied to these piezoelectric elements 4. Then, as shown in FIG. 5, in the plate-like elastic body 2, two secondary bending vibrations which are displaced in a direction approximately perpendicular to the fixing surface of the piezoelectric element 4 and whose wavelength directions are mutually orthogonal or approximately orthogonal (one bending vibration's wavelength direction is parallel with the paper surface (shown in the drawing) and the other's wavelength direction is perpendicular to the paper surface (not shown)) are generated. At the same time in the column-like elastic body 3, two primary bending vibrations which are displaced in a direction approximately parallel to the fixing surface of the piezoelectric element and whose displacement directions are mutually orthogonal or approximately orthogonal (one bending vibration's displacement direction is parallel with the paper surface (shown in the drawing) and the other's displacement direction is perpendicular to the paper surface (not shown)) are generated. When these vibrations are synthesized, a primary progressive wave along the circumferential direction of the plate-like elastic body 2 is excited on the surface of the plate-like elastic body 2 of the side on which the piezoelectric element 4 is not fixed.

The formation pattern of the electrode films of the piezoelectric element 4 is not limited to the one shown in FIGS. 3 and 4. For example, the structure may be that electrodes which are at positions such that their phases are shifted 180 degrees are treated as a pair by dividing a side surface of the piezoelectric element 4 into four and that alternating signals whose phases are shifted 90 degrees on a time scale are applied. The polarization direction also is not limited to the thickness direction. Various patterns are well known as the electrode film pattern of the piezoelectric element for generating a progressive wave on the surface of the elastic body on which the piezoelectric element is fixed.

When a moving element such as a rotor is brought into the pressure contact with the surface of the plate-like elastic body 2 in which the progressive wave is excited, the moving element moves as if it were pushed out by the progressive wave.

Figure 6:
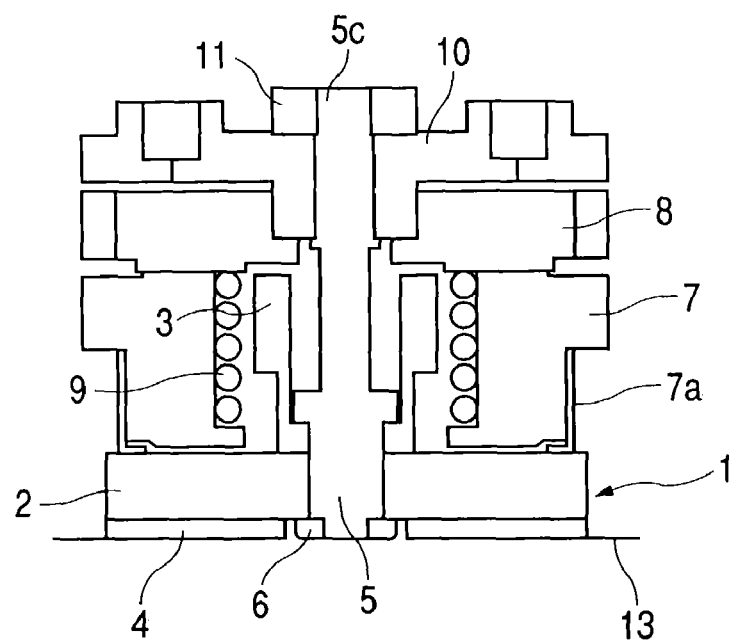
FIG. 6 is a cross-sectional view of the vibration type drive unit according to the present invention.

FIG. 6 shows a cross-sectional view of a vibration type drive unit (ultrasonic motor) in which the vibrator is employed.

The reference numeral 1 denotes the one constructed similarly to the vibrator 1 shown in FIG. 2, and the column-like elastic body 3 and the plate-like elastic body 2 are fixed by means of the supporting member 5 and the nut 6. A sliding member 7a of a rotor 7 is at a pressure contact with the surface of the plate-like elastic body 2 of the side on which the piezoelectric element 4 is not fixed. This sliding member 7a has elasticity and is fixed to the rotor 7 to rotate therewith as a unit. The reference numeral 8 denotes an output means, such as a gear and the like, which allows the rotor 7 to move in the rotation axis direction and engages with the rotor 7 so as to follow movement with the rotational movement of the rotor 7. The reference numeral 9 represents a pushing means, such as a spring and the like, which is disposed between a spring receiving portion of the rotor 7 and the output means 8 and pushes the rotor 7 so as to press it down in the vibrator 1 direction. The output means 8 is axially supported on the fixing member 10 fixing the supporting member 5, and the position of the output means 8 in its axial direction is defined by the fixing member 10. Screw threads are formed on a distal end portion 5c of the supporting member 5 of the side which does not engage with the nut 6, and these screw threads are engaged with a nut 11 so that the supporting member 5 is fixed on the fixing member 10. When for example a D-cut is imparted on the end portion 5c, it is possible to prevent the supporting member 5 from rotating with respect to the fixing member 10. Screw holes are provided in the fixing member 10, and by fixing the fixing member 10 on a desired portion by means of screws, the vibration type drive unit can be mounted on the desired portion. A flexible substrate 13 is fixed on the surface of the piezoelectric element 4 so as to play the role of supplying the alternating signal applied to the piezoelectric element 4 from an unillustrated power supply.

The above-described vibrator 1 excites a plurality of bending vibrations with the same degree in the plate-like elastic body 2 by applying an alternating signal to the piezoelectric element 4. By arranging the column-like elastic body 3 protruding so as to be orthogonal to the surface of the piezoelectric element 4 on the central portion of the plate-like elastic body 2, a plurality of bending vibrations with the same degree which are displaced in a direction approximately parallel to the surface of the piezoelectric element are excited in the column-like elastic body 3 so that the natural frequency of the entire vibrator 1 can be decreased. Although it may be thought that the mass of the vibrator 1 is increased in order to decrease the natural frequency of the vibrator 1, when the shape is that the column-like elastic body 3 is arranged on the central portion of the plate-like elastic body 2 as shown in FIG. 6, the column-like elastic body 3 can be disposed to oppose the inner diameter portion of the through hole in the central portion of the rotor. Thus, only the thicknesses of the plate-like elastic body 2 and the piezoelectric element 4 influence the vibrator 1 with respect to the length in the rotation axis direction of the motor, and it is possible to largely contribute to miniaturization in the rotation axis direction of the motor.

Although the column-like elastic body 3 can be complexly shaped, it is preferred that the body 3 has a shape such that the body 3 can be accommodated in the inner diameter portion of the rotor 7 without making a useless space. As the vibrator shown in FIGS. 13A and 13B, in order to decrease the natural frequency of the vibrator 1 it is effective to provide a portion whose outer diameter is small on the column-like elastic body 3 as a groove to enlarge the displacement. By the shape provided with the displacement enlarging groove, as the natural frequency is decreased, the vibrator 1 which can be usefully arranged in the inner diameter portion of the rotor 7 can be provided.

Figure 7A:
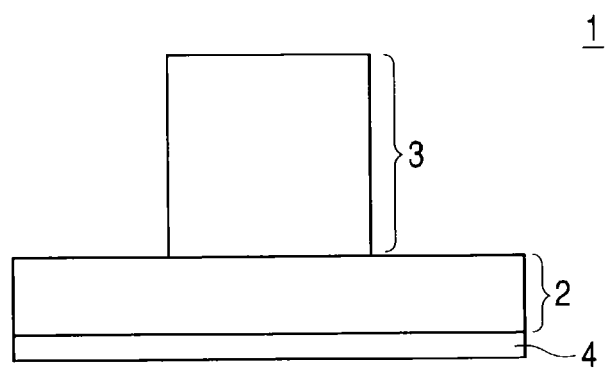
FIGS. 7A, 7B and 7C are schematic views of another form of the vibrator constructing the vibration type drive unit according to the present invention.
Figure 7B:
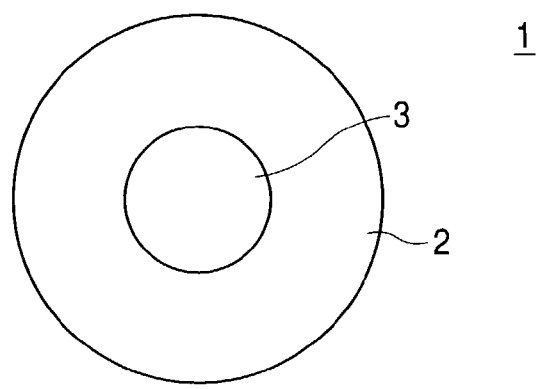
Figure 7C:
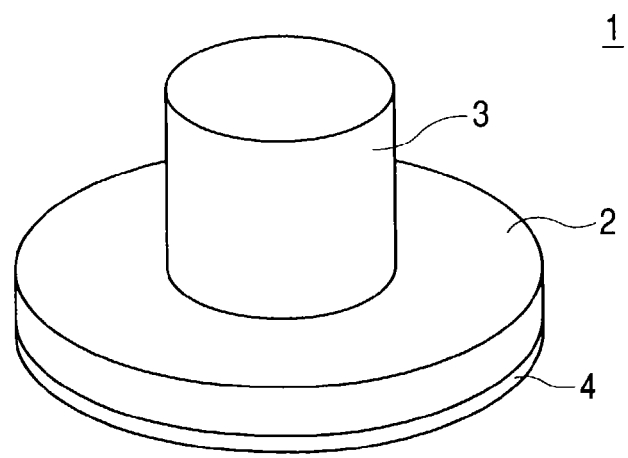
Figure 8:
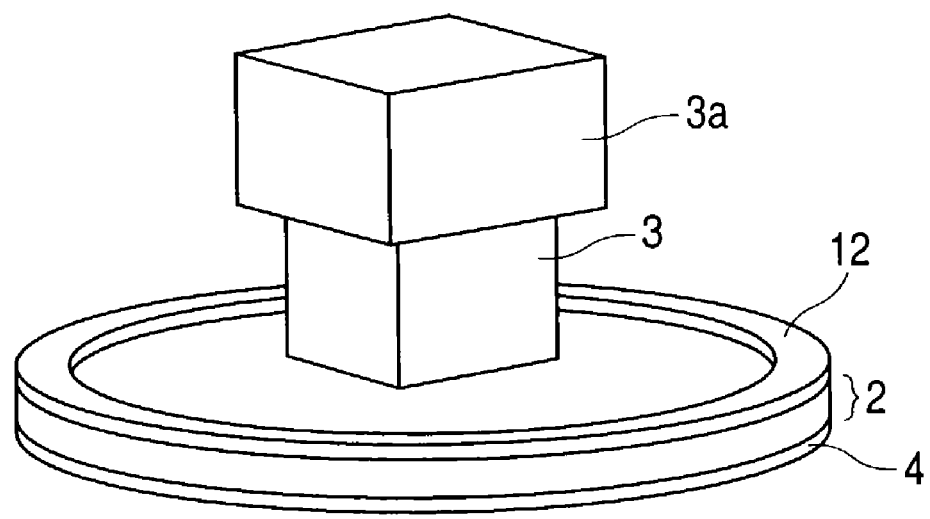
FIG. 8 is a schematic view of yet another form of the vibrator constructing the vibration type drive unit according to the present invention.

The shape of the vibrator 1 is not limited to the above-described shape. For example, the vibrator 1 shown in FIGS. 7A, 7B and 7C has a column-like shape that the cross-sectional shape of the column-like elastic body 3 is a circle, and there is no problem if the cross-sectional shape is other shapes such as a polygon. The vibrator 1 shown in FIG. 8 is the one constructed in such a manner that the mass of a distal end portion of the column-like elastic body 1 is increased. By increasing the mass of the distal end portion of the column-like elastic body 3, the natural frequency of the vibrator 1 can be further decreased, similarly to forming a narrow portion.

Various types of processing are possible not only for the column-like elastic body 3 of the vibrator 1 but also for the plate-like elastic body 2. For example, a friction member 12 is fixed on the surface of the plate-like elastic body 2 of the vibrator 1 shown in FIG. 8. By arranging the friction member 12 on a portion of the plate-like elastic body 2 with which the rotor is brought into pressure contact and slides, it becomes possible to improve the durability of a vibration type drive unit.

Figure 9:
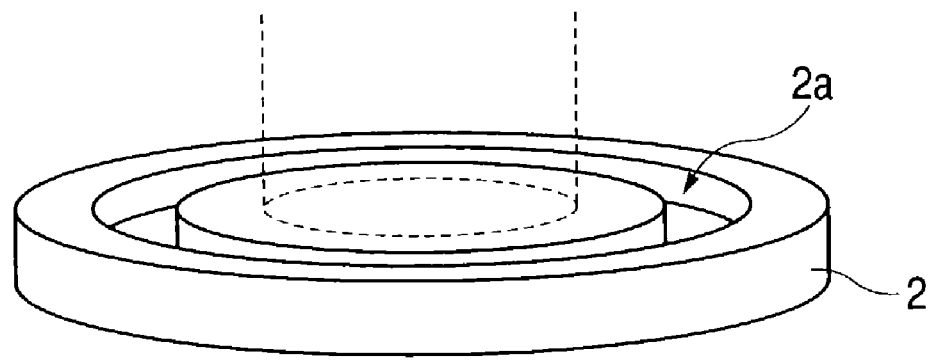
FIG. 9 is a perspective view of a plate-like elastic body of the vibrator constructing the vibration type drive unit according to the present invention.

A groove (narrow portion) 2a to enlarge the vibration displacements of secondary bending vibrations which are displaced in a direction approximately perpendicular to the surface of the piezoelectric element is formed on the plate-like elastic body 2 of the vibrator 1 shown in FIG. 9.

Figure 10:
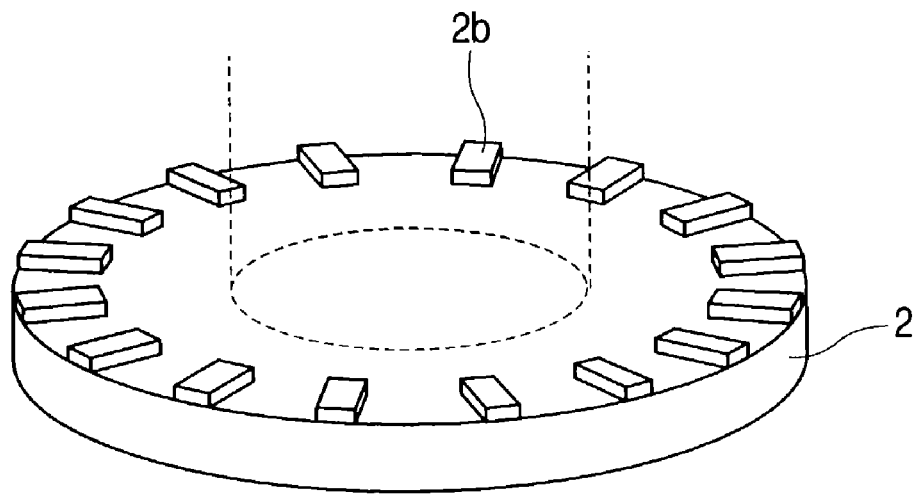
FIG. 10 is a perspective view of another plate-like elastic body of the vibrator constructing the vibration type drive unit according to the present invention.

A plurality of protrusions 2b to be the friction members along the peripheral direction are formed on a portion of the plate-like elastic body 2 shown in FIG. 10 with which the rotor is brought into pressure contact and slides. Since the protrusions 2b are plurally divided to pieces, it is possible to prevent enhancement of the rigidity of a vibrator, which is caused by the friction members, differently from the friction member formed on the annular shape of FIG. 8.

Figure 11:
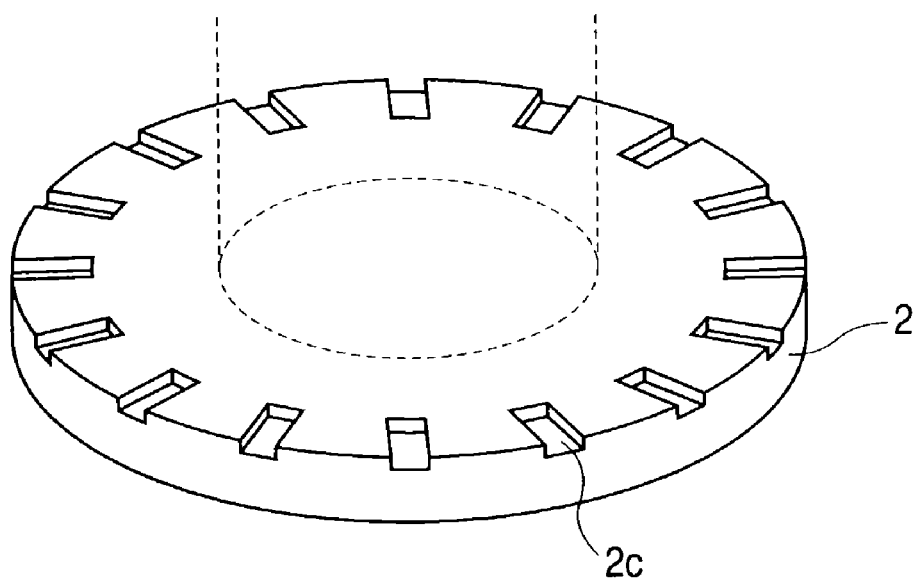
FIG. 11 is a perspective view of yet another plate-like elastic body of the vibrator constructing the vibration type drive unit according to the present invention.
Figure 12A:
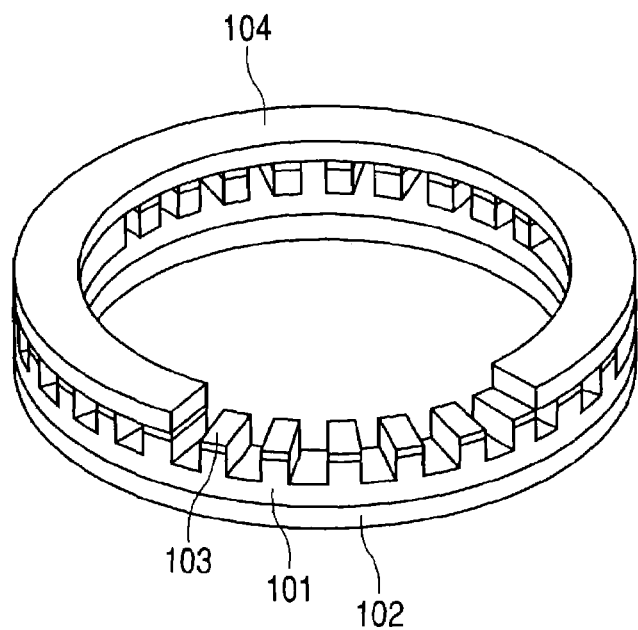
FIGS. 12A and 12B are cross-sectional views of a conventional annular type vibration type drive unit and a view showing its vibrator and moving element.
Figure 12B:
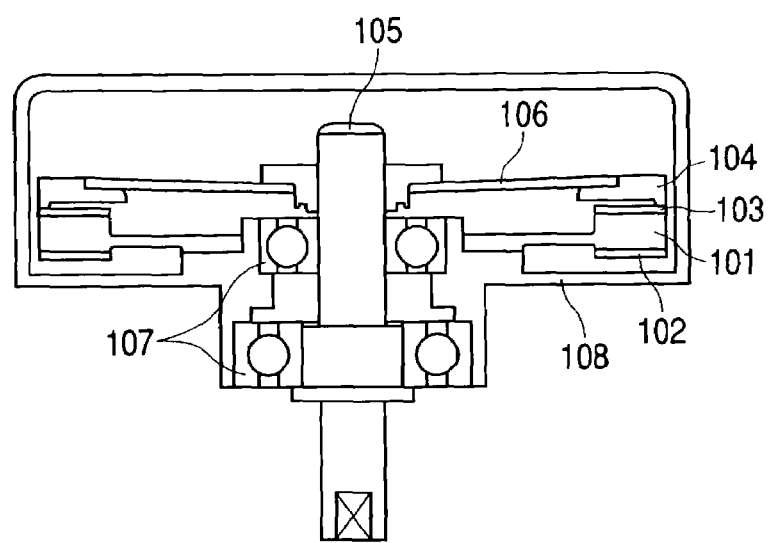

The plate-like elastic body 2 shown in FIG. 11 is not provided with any friction member and is constructed by a material having wear resistance. A plurality of recesses are formed on the surface of the plate-like elastic body 2 along the peripheral direction. Portions whose rigidity is partly small are formed in the vibrator due to the recesses, enabling enlargement of the vibration displacement of the vibrator.

As described above, with the above-described structures, a vibrator can be miniaturized without increasing the natural frequency thereof. That is, a vibration type drive unit with a greater drive efficiency can be provided in the case of approximately the same level of size.

What is claimed is:

1. A vibration type drive unit comprising:
    a vibration element consisting of an elastic member to which an electro-mechanical energy conversion element is fixed;
    a moving element which is in contact with a surface of said vibration element;
    a supporting member which penetrates inside of said vibration element to support the vibration element;
    a fitting member which fits into the supporting member to fix the vibration element to the supporting member,
    wherein said vibration element is in contact with said moving element at a surface of said vibration element opposite to a surface of said vibration element to which the electro-mechanical conversion element is fixed,
    a projection portion is formed on the surface of said vibration element with which said moving element is in contact, and
    the projection portion faces an inner diameter portion of said moving element, and generates, when an alternating signal is applied onto the electro-mechanical energy conversion element, a bending vibration of which a displacement direction is different from that generated on the surface of the vibration element with which said moving element is in contact, and
    wherein the electro-mechanical energy conversion element is disposed around the fitting member.

2. A vibration type drive unit according to claim 1, wherein the projection portion of said vibration element generates a bending vibration different from that generated on the surface of said vibration element, with which the moving element is in contact, in the displacement directions and orders thereof.

3. A vibration type drive unit according to claim 1, wherein the projection portion of said vibration element is projected in a direction perpendicular to the surface to which the electro-mechanical energy conversion element is fixed.

4. A vibration type drive unit according to claim 1, wherein said vibration element is formed by fixing the elastic member to which the electro-mechanical energy conversion element is fixed to a second elastic member forming the projection portion.

5. A vibration type drive unit according to claim 4, wherein the elastic member to which the electro-mechanical energy conversion element is fixed to the second elastic member forms the projection portion by a support member penetrating through inner portions of the elastic member and the second elastic member respectively.

6. A vibration type drive unit according to claim 5, wherein said moving element rotates about the support member.

7. A vibration type drive unit according to claim 1, wherein, when the alternating signal is applied onto the electro-mechanical energy conversion element, said vibration element:
    generates on the surface contacting with the moving element a plurality of first bending vibrations each of which displaces in a direction perpendicular to the surface to which the electro-mechanical energy conversion element is fixed, and
    generates on the projection to the surface to which second bending vibrations each of which order is different from those of the first bending vibrations and each of which displaces in a direction parallel to the surface to which the electro-mechanical energy conversion element is fixed.

* * * * *

UNITED STATES PATENT AND TRADEMARK OFFICE
CERTIFICATE OF CORRECTION

PATENT NO. : 7,015,623 B2
APPLICATION NO. : 10/612152
DATED : March 21, 2006
INVENTOR(S) : Kiyoshi Nitto Page 1 of 1

It is certified that error appears in the above-identified patent and that said Letters Patent is hereby corrected as shown below:

COLUMN 3:
Line 3, "characteristics" should read --the characteristics--.
Line 19, "characteristics" should read --the characteristics--.
Line 32, "characteristics" should read --the characteristics--.

COLUMN 4:
Line 64, "method that" should read --method wherein--.
Line 65, "thought." should read --contemplated.--.

COLUMN 5:
Line 18, "that fixing" should read --in which fixing--.
Line 25, "thought" should read --contemplated--.

COLUMN 6:
Line 63, "shape is that" should read --shape is such that--.

COLUMN 7:
Line 11, "13B," should read --13B demonstrates,--.
Line 20, "the shape" should read --the design--.
Line 22, "shape that" should read --shape such that--.

Signed and Sealed this

Fifth Day of September, 2006

JON W. DUDAS
*Director of the United States Patent and Trademark Office*